(12) United States Patent
Yasui et al.

(10) Patent No.: US 6,311,913 B1
(45) Date of Patent: Nov. 6, 2001

(54) FISHING LINE GUIDING MECHANISM FOR SPINNING REEL

(75) Inventors: Toshihiko Yasui, Tondabayashi; Shinichi Morimoto, Nishinomiya, both of (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/505,712

(22) Filed: Feb. 17, 2000

(30) Foreign Application Priority Data

Feb. 22, 1999 (JP) .................................................. 11-043429

(51) Int. Cl.⁷ .................................................. A01K 89/01
(52) U.S. Cl. .............................................................. 242/231
(58) Field of Search ............................................... 242/231

(56) References Cited

U.S. PATENT DOCUMENTS

| | | | |
|---|---|---|---|
| 2,728,534 | * 12/1955 | Wallace | 242/231 |
| 3,834,644 | * 9/1974 | Stackawicz | 242/231 |
| 5,513,813 | * 5/1996 | Bernard et al. | 242/231 |
| 5,730,377 | * 3/1998 | Shinohara | 242/231 |
| 5,911,377 | * 6/1999 | Jung | 242/231 |
| 6,149,088 | * 11/2000 | Bernard et al. | 242/231 |

* cited by examiner

Primary Examiner—Katherine A. Matecki
(74) Attorney, Agent, or Firm—Shinjyu Global IP Counselors, LLP

(57) ABSTRACT

A fishing line guiding mechanism (7) for a spinning reel movably supported on one end of one of the pair of rotor arms (3a) for guiding a fishing line (L) to a spool (4). The fishing line guiding mechanism (7) includes a pair of bail supporting members (8), a line roller (9), a fixing shaft cover (10), a bail (11) and a brushing member (20). The pair of bail supporting members (8) is pivotally supported at ends of respective rotor arms (3a). The line roller (9) is rotatably supported at one end of one of the pair of the bail supporting members (8). The fixing shaft cover (10) is fixed to the bail supporting member (8) via the line roller (9). The bail (11) is made of a wire rod and connects the fixing shaft cover (10) with the other end of the bail supporting member (8). The brushing member (20) includes string type elastic member that is provided on one of the pair of the bail supporting members (8) so that tip of the elastic member contacts the line roller (9).

9 Claims, 4 Drawing Sheets

FISHING LINE GUIDING MECHANISM FOR SPINNING REEL

BACKGROUND OF THE INVENTION

1. Field of the Invention

The present invention relates to a fishing line guiding mechanism. More specifically, the present invention relates to a fishing line guiding mechanism for a spinning reel, the fishing line guiding mechanism being provided at an end of a rotor arm of a rotor of the spinning reel, the fishing line guiding mechanism for guiding a fishing line to a spool disposed along a rotational axis of the rotor.

2. Background Information

In general, a spinning reel includes a reel main body, a rotor, and a spool. The rotor is rotatably supported on the reel main body. The spool is typically disposed on the reel main body in front of the rotor and is supported by the reel main body so as to reciprocate along an axis of rotation of the rotor. The rotor includes a cylindrical portion and a pair of rotor arms. The cylindrical portion is rotatably supported by the reel main body. Each of the pair of rotor arms extends from the rear portion of the cylindrical portion in a forward direction and a fishing line guiding mechanism for guiding a fishing line to the spool is provided at the ends of the pair of the rotor arms. The fishing line guiding mechanism is provided at the end of the pair of the rotor arms so as to be interchangeable from a fishing line guiding state, in which the fishing line is guided to the spool as the rotor rotates, to a fishing line releasing state, in which the fishing line may be easily cast off from the spool.

The fishing line guiding mechanism includes a pair of bail supporting members, a line roller, a fixed shaft cover, and a bail. Each of the pair of bail supporting members is movably supported on a respective end of the pair of the rotor arms. The line roller is rotatably supported on one end of one of the pair of the bail supporting members. The fixed shaft cover is fixed one of the pair of the bail supporting members adjacent to the line roller. The bail is a wire rod and one end of the bail is connected to the fixed shaft cover.

When using a spinning reel having this type of fishing line guiding mechanism, the fishing line guiding mechanism is moved to the line releasing state by a user for casting the line. Further, the guiding mechanism switches to the line guiding state when winding the line to the spool. When the line guiding mechanism switches to the line guiding state, the line is longer able to leave the spool and rather is guided around the spool via the line roller from the bail as the rotor rotates.

In the above-mentioned conventional fishing line guiding mechanism, the fishing line may fall away from the line roller when the line becomes loose and has insufficient tension as sometimes occurs in a retrieving or reeling operation. Once the fishing line falls away from the line roller, there is a possibility that it may cause backlashing or tangles around the rotor or the skirt portion of the spool.

SUMMARY OF THE INVENTION

Accordingly, the purpose of the present invention is to prevent a fall of the fishing line from the line roller in a fishing line guiding mechanism for spinning reels.

In accordance with one embodiment of the present invention, a fishing line guiding mechanism for a spinning reel is pivotally supported at an end of a rotor arm of a spinning reel for guiding a fishing line to a spool disposed radially inward therefrom. The fishing line guiding mechanism includes a bail supporting member supported on an end of the rotor arm for pivotal movement with respect thereto. A line roller is rotatably supported on an end of the bail supporting member and a fixed shaft cover is fixed to the bail supporting member via the line roller. One end of a thick wire bail is fixed to the fixed shaft cover. A brushing member having a string-like (filamentous) elastic tip is supported on the bail supporting member such that the tip contacts the fishing line and the line roller.

In the above described fishing line guiding mechanism, the fishing line guided to the line roller is guided to the spool while making contact with the brushing member. Therefore, the fishing line is not likely to fall from the line roller because of a small amount of tension applied to the fishing line by the elasticity of the brushing member. Further, even if the fishing line becomes slack (has no other tension applied to it) the fishing line is still retained in place by the brushing member.

Preferably, the brushing member tip includes a plurality of elastic filaments for contact with the fishing line and the line roller.

Accordingly, the plurality of elastic filaments brush on the fishing line and the line roller to better retain the fishing line in place.

Preferably, the line roller is formed with an annular fishing line guiding groove and the brushing member is positioned such that at least a portion of the tip ends contact the fishing line guiding groove for retaining the fishing line in the fishing line guiding groove. Accordingly, the fishing line is retained within the fishing line guiding groove by the brushing member.

Alternatively, the brushing member includes a single string-like elastic member bent into a U-shaped loop, and the bend in the U-shaped loop contacts the fishing line and the line roller.

Accordingly, the loop brushes on both the fishing line and the line roller to better retain the fishing line in position on the line roller. Further, with the loop made of a single string-like elastic member, water is less likely to be retained and the loop is less likely to freeze.

Preferably, the line roller is formed with an annular fishing line guiding groove and the brushing member is positioned such that a portion of the U-shaped loop traverses the fishing line guiding groove for retaining the fishing line in the fishing line guiding groove.

In the above described guiding mechanism, the brushing member firmly contacts the fishing line and the fishing line guiding groove retaining the fishing line in the fishing line guiding groove.

These and other objects, features, aspects and advantages of the present invention will become apparent to those skilled in the art from the following detailed description, which, taken in conjunction with the annexed drawing, discloses a preferred embodiment of the present invention.

BRIEF DESCRIPTION OF THE DRAWINGS

Referring now to the attached drawing which forms a part of this disclosure.

DETAILED DESCRIPTION OF THE PREFERRED EMBODIMENT

Figure 1:
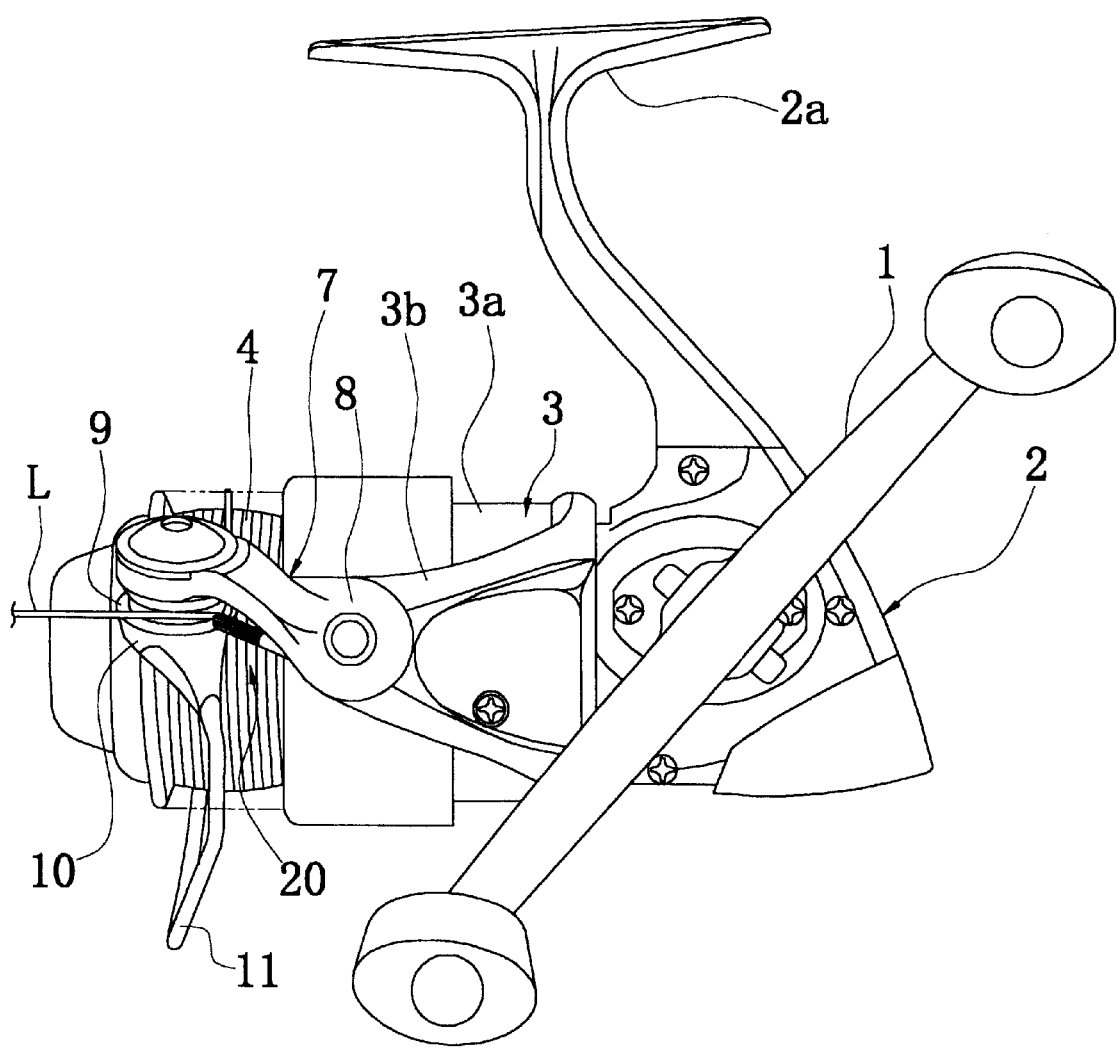
FIG. 1 is a side view of a spinning reel in accordance with one embodiment of the present invention.

As shown in FIG. 1, a spinning reel in accordance with a first embodiment of the present invention includes a reel main body 2, a rotor 3, and a spool 4. The reel main body 2 has a handle 1. The rotor 3 is rotatably supported by the reel main body 2 and is disposed at a front side thereof (the left side of FIG. 1). The spool 4 is located along a rotational axis of the rotor 3 at a front side of the rotor 3 and a fishing line L extends from in front of the spinning reel and is wound around the spool 4.

A fishing rod installation portion 2a for installing the spinning reel on a fishing rod is provided at an upper portion of the reel main body 2. Several mechanisms (not shown) are provided in the reel main body 2 such as a rotor driving mechanism (not shown) for rotating the rotor 3 in accordance with the rotation of the handle 1 and an oscillating mechanism (not shown) for uniformly winding the fishing line around the spool 4 by moving the spool 4 in back and forth along the rotation axis of the rotor 3.

The rotor 3 includes a cylindrical portion 3a and a pair of rotor arms, although only one rotor arm 3b of the pair of rotor arms is shown in FIG. 1. The cylindrical portion 3a is rotatably supported by the reel main body 2. The pair of the rotor arms is provided so as to be opposed to each other, both rotor arms extending towards the front side of the spinning reel from the cylindrical portion 3a. The rotor arm 3b extends toward the front of the spinning reel in a direction generally parallel to the rotational axis of the rotor 3. A fishing line guiding mechanism 7 is movably supported by an end of the rotor arm 3b.

Figure 2:
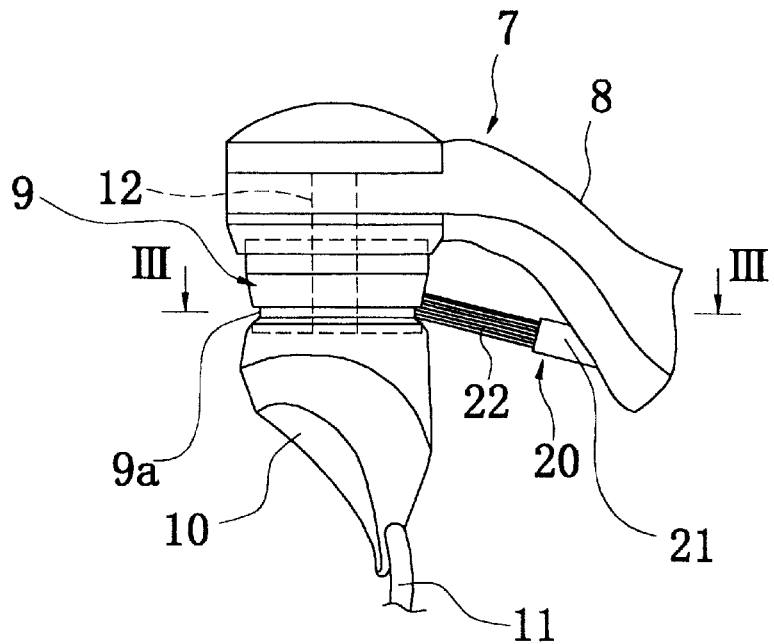
FIG. 2 is a fragmentary side view of a fishing line guiding mechanism of the spinning reel depicted in FIG. 1.

As shown in FIGS. 1 and 2, the fishing line guiding mechanism 7 includes a pair of bail supporting members 8 (although only one of the bail supporting members 8 is shown in FIG. 1), a line roller 9, a fixed shaft cover 10, and a bail 11. Each of the pair of bail supporting members 8 is pivotally supported by respective ends of the pair of the rotor arms 3b. The line roller 9 is rotatably supported on one end of one of the pair of the bail supporting members 8. The fixed shaft cover 10 is disposed at one end of the one of the pair of the bail supporting members 8 adjacent to the line roller 9. One end of the bail 11 is connected to the fixed shaft cover 10 and the other end of the bail 11 is connected to the undepicted bail supporting member. As shown in FIG. 2, the fixed shaft cover 10 includes a fixed shaft 12 that extends towards the end of the bail supporting member 8. The line roller 9 is roratably supported by the fixed shaft 12. The line roller 9 includes a fishing line guiding groove 9a which is located on an outer periphery surface thereof on a side adjacent to the fixed shaft cover 10. The fishing line guiding groove 9a is provided in order to prevent twists in the fishing line L as the fishing line L is wound around the spool 4.

Figure 3:
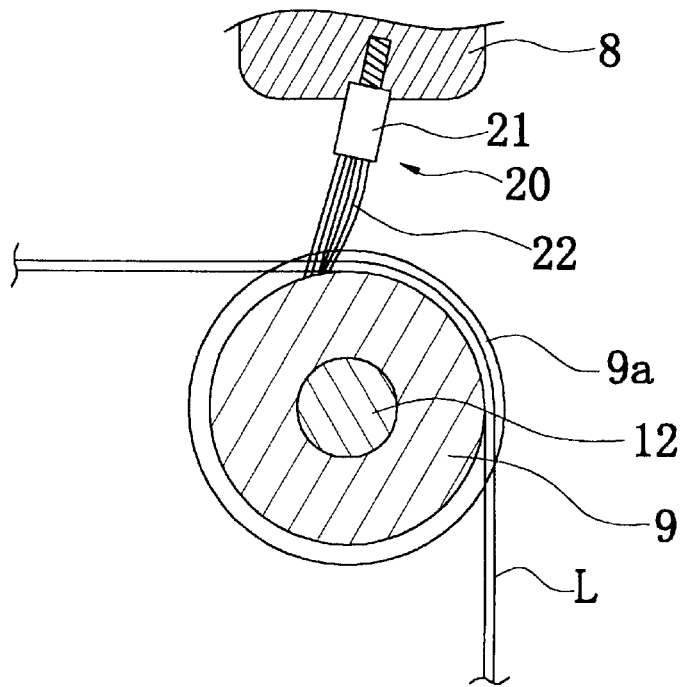
FIG. 3 is a fragmentary cross-sectional view taken along the line III—III in FIG. 2.
Figure 4:
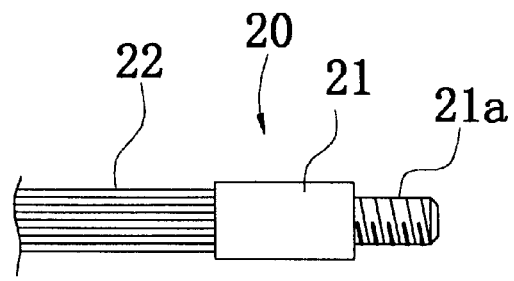
FIG. 4 is a fragmentary side view of a brushing member of the fishing line guiding mechanism depicted in FIGS. 2 and 3.

A brushing member 20 is supported on a mid-portion of the bail supporting member 8 such that the brushing member 20 extends toward the line roller 9. As shown in FIGS. 2, 3 and 4, the brushing member 20 includes a base portion 21 and a brushing portion 22. The brushing portion 22 may be made with a plurality of string-like elastic members which are held together by the base portion 21. The base portion 23 is formed with a screw portion 21a so that the brushing member 20 may be removably fixed to the bail supporting member 8 by screwing the screw portion 21a in a threaded hole (not shown) in the mid-portion of the bail supporting member 8.

Alternatively, the bail supporting member 8 may be formed with a small hole (not shown) for snugly receiving an end of the brushing member 20. In this case, the brushing member 20 may be pulled out of the small hole with sufficient force.

The brushing portion 22 is dimensioned such that its tip makes contact with the fishing line L and the line roller 9. For example as shown in FIG. 2, the brushing portion 22 is provided so that its tip makes contact with the fishing line guiding groove 9a. Also, the tip of the brushing portion 22 is inclined as toward a left side of the line roller 9, as shown in FIG. 3, in order to exert a predetermined level of force on the fishing line L retained in the fishing line guiding groove 9a as the fishing line L is wound around the spool 4. The string-like elastic members used in the brushing portion 22 are preferably made of a synthetic resin such as nylon or a metal such as stainless wire.

In the spinning reel having the above-mentioned structure, the fishing line L is wound around the spool 4 guided by the bail 11 and the line roller 9 when the rotor 3 is rotated by the handle 1. The fishing line L is guided to the fishing line guiding groove 9a of the line roller 9. The tip of the brushing portion 22 of the brushing member 20 makes contact with the fishing line L guided to the fishing line guiding groove 9a. As a result, a small level of force is applied to the fishing line L between the line roller 9 and the spool 4. Also, the fishing line L is pushed against the line roller 9.

As a result, since a minimal tension is applied to the fishing line L at the contacting site of the brushing portion 22 with the fishing line L, the fishing line L is smoothly wound around the spool 4. As a result, a generation of backlashing or the fishing line tangles around the lower portion of the spool may be prevented. Also, since it is possible to give tension to a close coiling reel in which fishing line L is closely wound to the spool 4, backlashing is hardly caused. Moreover, even if the fishing line guiding groove 9a is not present in the line roller 9, the possibility of twisting of the fishing line L due to a sideslipping of the line may be reduced since the sideslipping of the fishing line L may be prevented by the brushing member 20.

Figure 5:
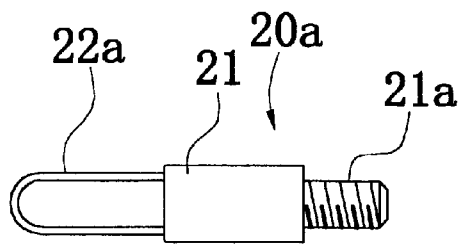
FIG. 5 is a side view similar to FIG. 6 showing a brushing member in accordance with an alternate embodiment.
Figure 6:
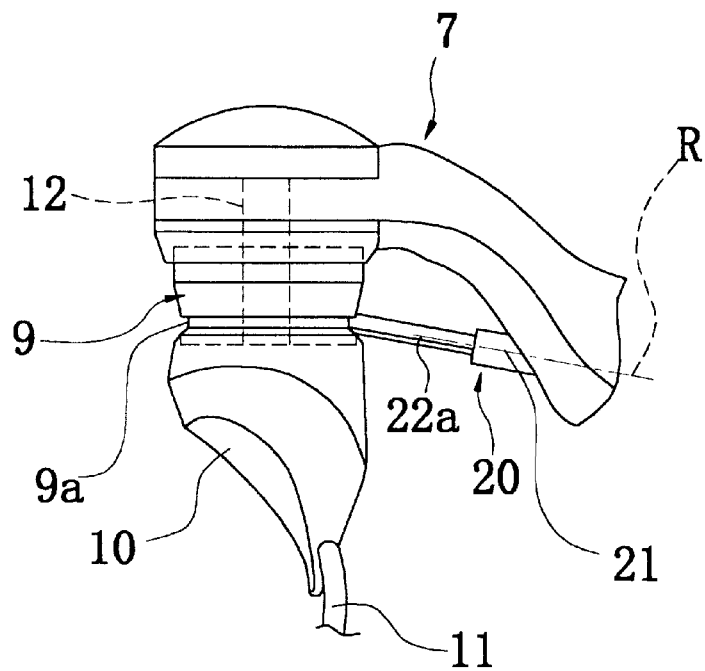
FIG. 6 is a fragmentary side view similar to FIG. 2 showing yet another embodiment of the present invention.
Figure 7:
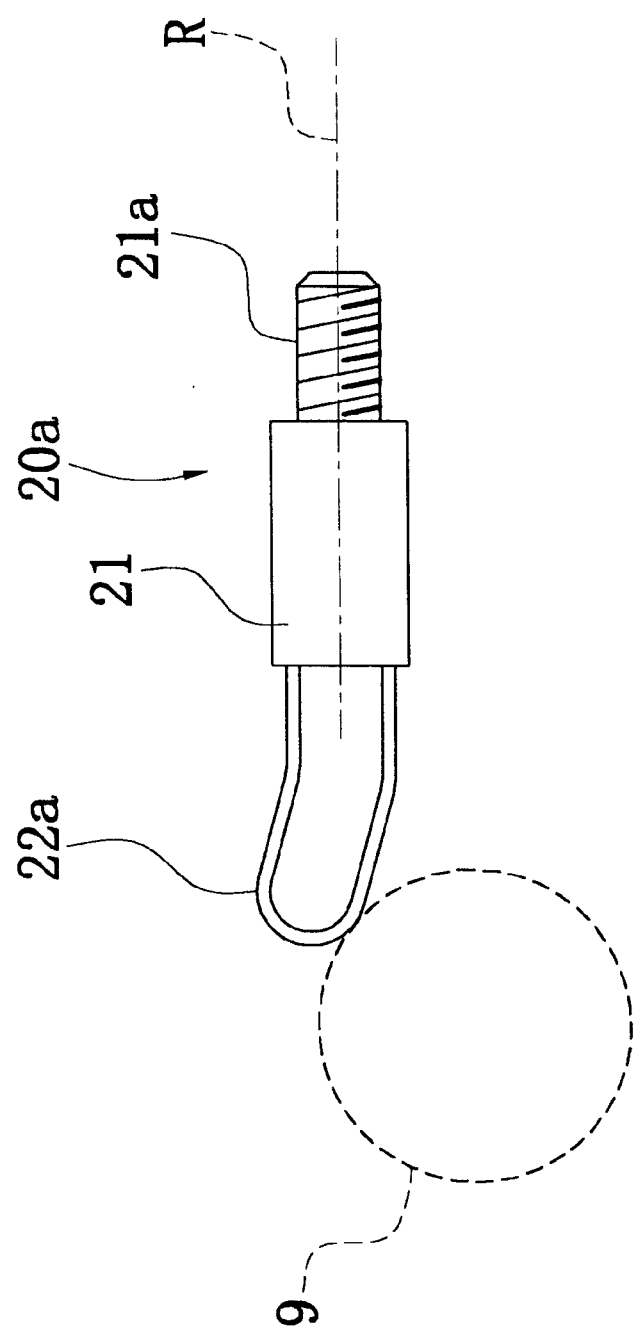
FIG. 7 is a side view similar to FIG. 5 showing the brushing member contacting a line roller of the fishing line guiding mechanism.

Alternate Embodiments (a) Although the brushing portion 22 made of a number of string-like elastic members is provided in the above-described embodiment, a single string-like elastic loop member 22a may be bent to form a U-shaped loop as shown in FIGS. 5, 6 and 7. A portion of the tip of the loop member 22a is brought into contact with the fishing line L as the fishing line is guided around a portion of the line roller 9. It is preferable, as shown in FIG. 6, that the tip of the loop member 22a be angled with respect to the axis of rotation the line roller 9 so that the loop member 22a traverses the groove 9a. It is further preferable that the loop member 22a be rotated slightly about a lengthwise axis R of the base portion 21 such that the tip end of the loop member 22a contacts the fishing line guiding groove 9a, as shown in FIG. 6, with both legs of the loop member 22a being visible when looking from a direction perpendicular to the axis of rotation of the line roller 9.

In this embodiment, since there is only a single string like member constituting the loop member 22a, the loop member 22a is not likely to retain water and is not likely to freeze at freezing temperatures. Also, since the loop member 22a traverses the fishing line guiding groove 9a, the fishing line L extending to the line roller 9 via the bail 11 is smoothly guided to the fishing line guiding groove 9a by the brushing member 20a.

(b) Although the base portion 21 is provided in the above-mentioned embodiment in order to make the brushing member 20 removable with respect to the bail supporting member 8, it is possible, without having the base portion 21, to form a brushing member on the bail supporting member 8 by embedding the brushing portion 22a directly in a hole (not shown) in the bail supporting member 8.

(c) Although the brushing member 22a is fixed to the bail supporting member 8 in the embodiments described above, the brushing member 20 may be provided on the bail supporting member 8 so that the brushing member 20 may operate during a line-winding and dragging operation. In such a case, the brushing portion 22 may make contact with the line roller 9 during the line-winding operation or it may make contact with the line roller 9 during the dragging operation.

(d) The present invention may be applied to an in-spool type spinning reel.

Effect of the Invention

In the fishing line guiding mechanisms for spinning reels according to the present invention, since the fishing line L guided by the line roller 9 is guided to the spool while making contact with a brushing roller (20 and 20a) made of string-like elastic member(s), the fishing line is not likely to fall from or come out of contact with the line roller due to the low level of force applied to the fishing line L thereby keeping a small level of tension on the fishing line L as it is guided to the line roller 9. Further, even if the fishing line L is loosened slightly and tension is reduced, the fishing line L will still remain on the line roller 9 and in the groove 9a.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. For a spinning reel having a rotor-frontward, skirted spool disposed radially inward of an opposed pair of rotor arms, a fishing line guiding mechanism pivotally supported endwise on one of the rotor arms for guiding fishing line onto the spool, the fishing line guiding mechanism comprising:

a bail support member base-endwise being pivotally mounted on said one of the rotor arms and tip-endwise orthogonally supporting one end of a fixed shaft;

a line roller rotatably carried on the fixed shaft;

a fixed shaft cover fixed to the other end of the fixed shaft, with said line roller in between;

a thick wire bail connected to said fixed shaft cover opposite said line roller; and a brushing member having a filamentous elastic tip, said brushing member mounted on said bail support member on its radially inward surface and disposed at an inclination diametrically with respect to the roller such that said tip pressure-contacts with a predetermined level of force both said line roller and fishing line being guided onto the spool.

2. A fishing line guiding mechanism according to claim 1, wherein said filamentous elastic tip of said brushing member comprises a plurality of elastic filaments for contact with both said line roller and fishing line being guided onto the spool.

3. A fishing line guiding mechanism according to claim 2, wherein:

said line roller is formed with an annular fishing line guiding groove; and said brushing member is positioned such that at least a portion of said tip contacts said fishing line guiding groove for retaining the fishing line in said fishing line guiding groove.

4. A fishing line guiding mechanism according to claim 1, wherein said filamentous elastic tip of said brushing member comprises a single string-like elastic member bent into a U-shaped loop whose bend contacts both said line roller and fishing line being guided onto the spool.

5. A fishing line guiding mechanism according to claim 4, wherein:

said line roller is formed with an annular fishing line guiding groove; and said brushing member is disposed such that the bend in said U-shaped loop traverses said fishing line guiding groove for retaining in said fishing line guiding groove fishing line being guided onto the spool.

6. A fishing line guiding mechanism according to claim 1, wherein said brushing member is removably mounted on said bail supporting member.

7. A fishing line guiding mechanism according to claim 1, wherein the base end of said brushing member is threaded.

8. For a spinning reel having a spool disposed radially inward of an opposed pair of rotor arms, a fishing line guiding mechanism pivotally supported endwise on one of the rotor arms for guiding fishing line onto the spool, the fishing line guiding mechanism comprising:

a bail support member base-endwise being pivotally mounted on said one of the rotor arms and tip-endwise orthogonally supporting one end of a fixed shaft;

a line roller rotatably carried on the fixed shaft;

a fixed shaft cover fixed to the other end of the fixed shaft, with said line roller in between;

a thick wire bail connected to said fixed shaft cover opposite said line roller; and a brushing member having a single string-like elastic member bent into a U-shaped loop to form a filamentous elastic tip, said brushing member being mounted on said bail support member such that the bend in the U-shaped loop contacts both said line roller and fishing line being guided onto the spool.

9. A fishing line guiding mechanism according to claim 8, wherein:

said line roller is formed with an annular fishing line guiding groove; and said brushing member is disposed such that the bend in said U-shaped loop traverses said fishing line guiding groove for retaining in said fishing line guiding groove fishing line being guided onto the spool.

* * * * *